United States Patent [19]
Gehringer et al.

[11] Patent Number: 5,056,071
[45] Date of Patent: Oct. 8, 1991

[54] CD APPARATUS WITH DYNAMIC FUNCTION GENERATION

[75] Inventors: Reinhard Gehringer, Blumberg; Hans-Robert Kühn, St. Georgen, both of Fed. Rep. of Germany

[73] Assignee: Deutsche Thomson-Brandt GmbH, Villingen, Fed. Rep. of Germany

[21] Appl. No.: 250,851

[22] Filed: Sep. 28, 1988

[30] Foreign Application Priority Data

Sep. 30, 1987 [DE] Fed. Rep. of Germany ....... 3732938

[51] Int. Cl.$^5$ ...................... G11B 17/22; H04N 05/85
[52] U.S. Cl. ......................................... 369/30; 369/31; 369/75.1; 369/292; 340/724
[58] Field of Search ........................ 369/30, 31, 32, 33, 369/59, 83, 75.1, 292; 324/77; 368/29; 340/752, 724

[56] References Cited

U.S. PATENT DOCUMENTS

| | | | |
|---|---|---|---|
| 4,205,516 | 6/1980 | Terao | 368/29 |
| 4,449,198 | 5/1984 | Kroon et al. | 369/33 |
| 4,456,969 | 6/1984 | Herzik et al. | 369/83 |
| 4,492,917 | 1/1985 | Inami et al. | 324/77 |
| 4,641,135 | 2/1987 | Hilbrink | 340/784 |
| 4,766,581 | 8/1988 | Korn et al. | 369/30 |
| 4,855,842 | 8/1989 | Hayes et al. | 369/32 |
| 4,932,018 | 6/1990 | Nagasawa et al. | 369/59 |
| 4,939,714 | 7/1990 | Yamagishi et al. | 369/59 |

*Primary Examiner*—William M. Shoop, Jr.
*Assistant Examiner*—John W. Cabeca
*Attorney, Agent, or Firm*—Max Fogiel

[57] ABSTRACT

A compact disc recorder and/or playback unit in which a display is provided at an operational side of the set for displaying data that is intended for operation use of single record operation. A static and a dynamic display are provided. The dynamic display is related to the performance of searches or selection operations, and has a flow of motion of data elements related to search for selection operations that are arranged perpendicular to each other in respect to their direction of motion. Title or track search is carried out horizontally according to a horizontal plane of motion of a pick-up. Magazine compartment search is carried out vertically according to a vertical plane of motion corresponding to a direction of a record gripper or record lift, when using a magazine having record compartments one above the other.

3 Claims, 5 Drawing Sheets

CD APPARATUS WITH DYNAMIC FUNCTION GENERATION

BACKGROUND OF THE INVENTION

The invention relates to a CD-record- and/or playback-set.

It is known for CD-sets to have numerous displays at the operational side, usually the front side of the set, which eases the operation for the user. It is common, moreover, to give acknowledgement by a display each time when functions are released, for instance by pressing keys.

It is further-on known to indicate or display the presently played-back title number or the title- or track-number selected by the user. In magazine players it is additionally indicated, for instance by a LED-chain, if there are records in the separate compartments of the magazine or not. The present displays e g. for "search" have been only static. During the search- or selection-operation in the set, no display takes place showing or symbolizing these flows of motion.

The invention is based on the object to solve this deficiency.

SUMMARY OF THE INVENTION

According to the invention the actual flow of motion is displayed during the title- or track-search or during removal of a newly selected record from a magazine dynamically. This is by a motioned, accordingly varying display, especially the motion of the pick-up system horizontally, in one or the other direction. The change of records as selected from a magazine, is shown perpendicularly to the former. This is vertically, by a different display also according to the actual flow of motion of gripper or lift within the set.

In dynamic display it should be understood that horizontal and/or vertical display-segments are lit up in rapid sequence one after the other corresponding with the actual flow of motion for the named functions. This can be points, dashes, arrows, triangles, or letters as well as other suitable symbols.

DESCRIPTION OF THE PREFERRED EMBODIMENTS

For the illustration of the displays having dynamic display of a line-wise run, there serves in both figures an eight-position dot-matrix-display having nine times seven dots or points. Nine lines are shown. By rapid line-wise following each other, displaying of the symbols, e.g. by a timing with 0.1 to 0.5 sec., the impression is created of moving letters or in the illustrated case of a moving arrow. The indicated direction of the arrow corresponds with the physical direction of motion of the selected function, whereby the lines pass through from upper to lower lines.

Figure 1:
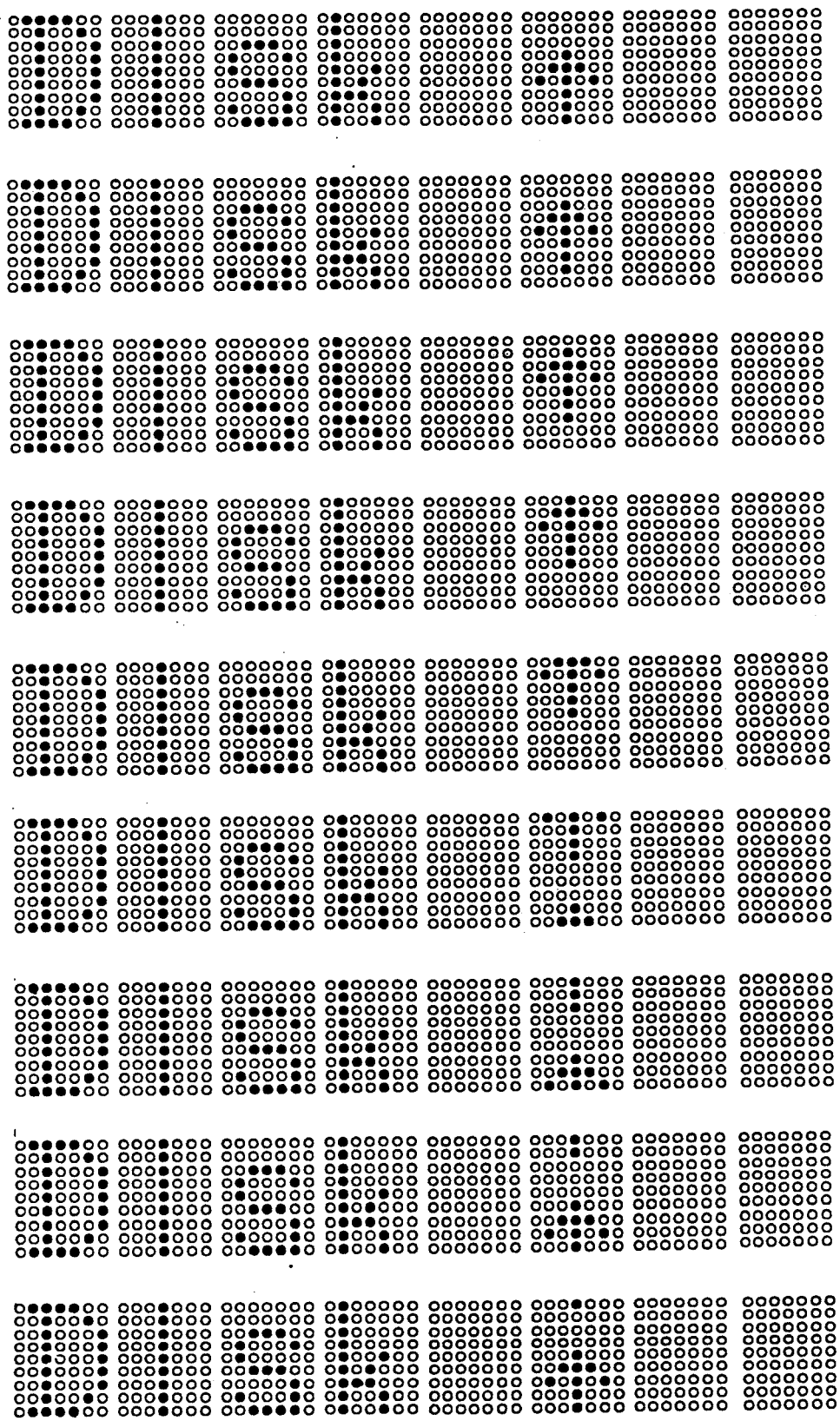
FIG. 1 shows a display "select disk upwards."

FIG. 1: Select a higher disk number: the vertical arrow moves upward.

Not shown, is the reversed display, where the arrow moves downward.

Figure 2:
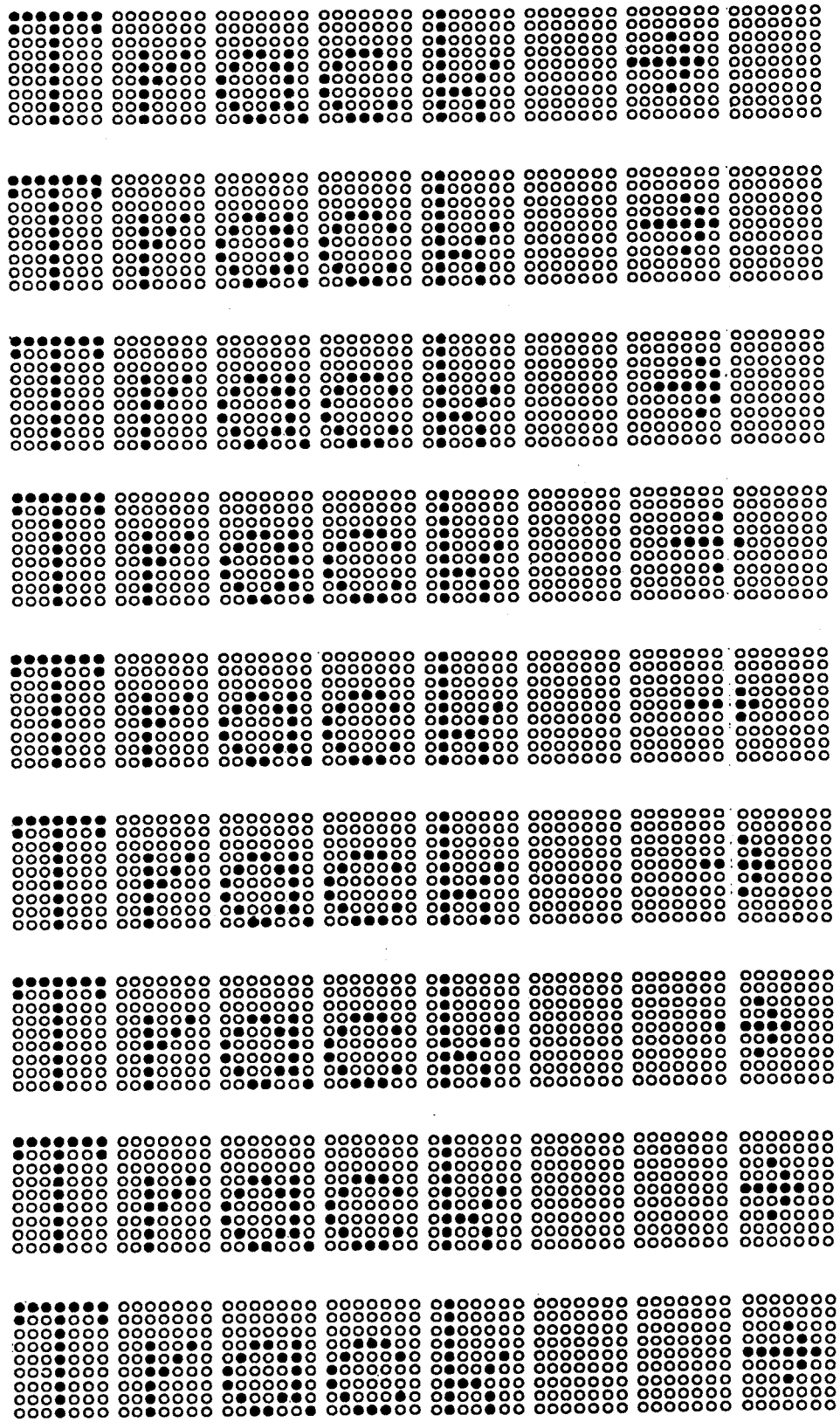
FIG. 2 shows a display "search track onward."
Figure 3:
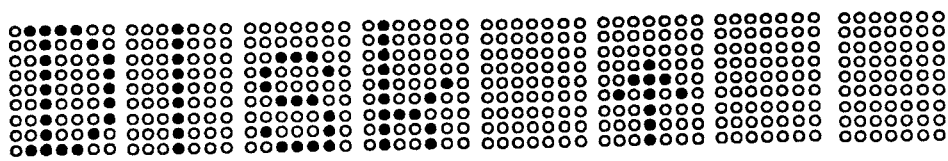
FIG. 3 is a display portion corresponding to the display shown in FIG. 1 and illustrates the condition where only the illuminated points are filled in, aside from the first line.
Figure 4:
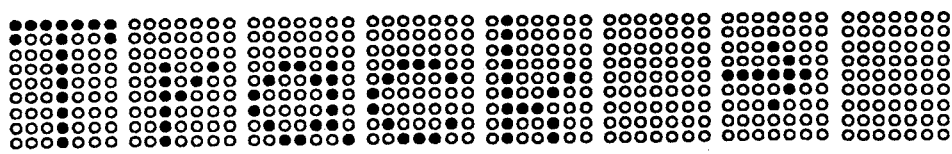
FIG. 4 is a display portion corresponding to the display situation of FIG. 2, and illustrates the condition where only the illuminated points are filled in, aside from the first line.
Figure 5:
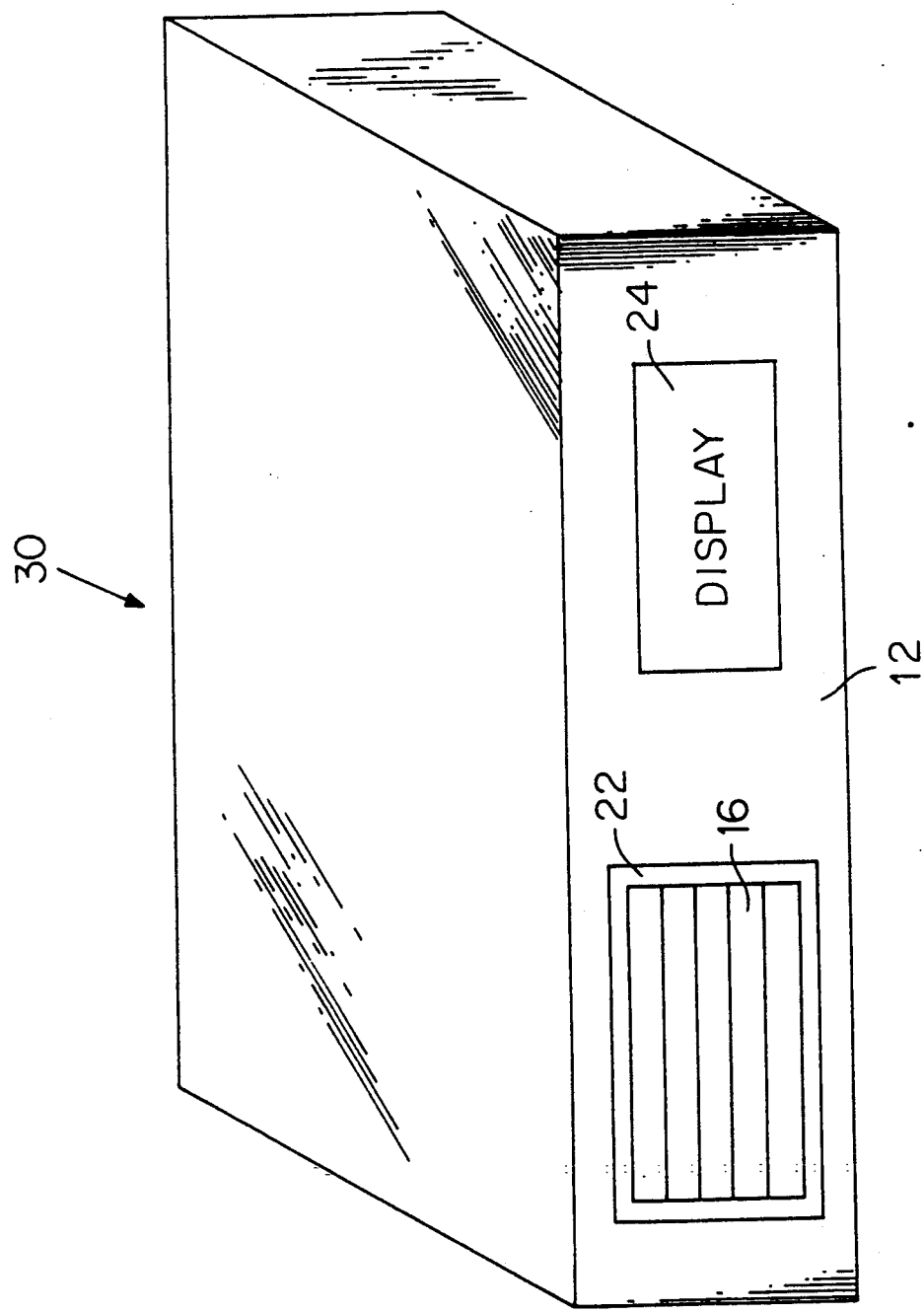
FIG. 5 is a schematic view and shows the compact disc recording and/or playback set, according to the present invention.
Figure 6:
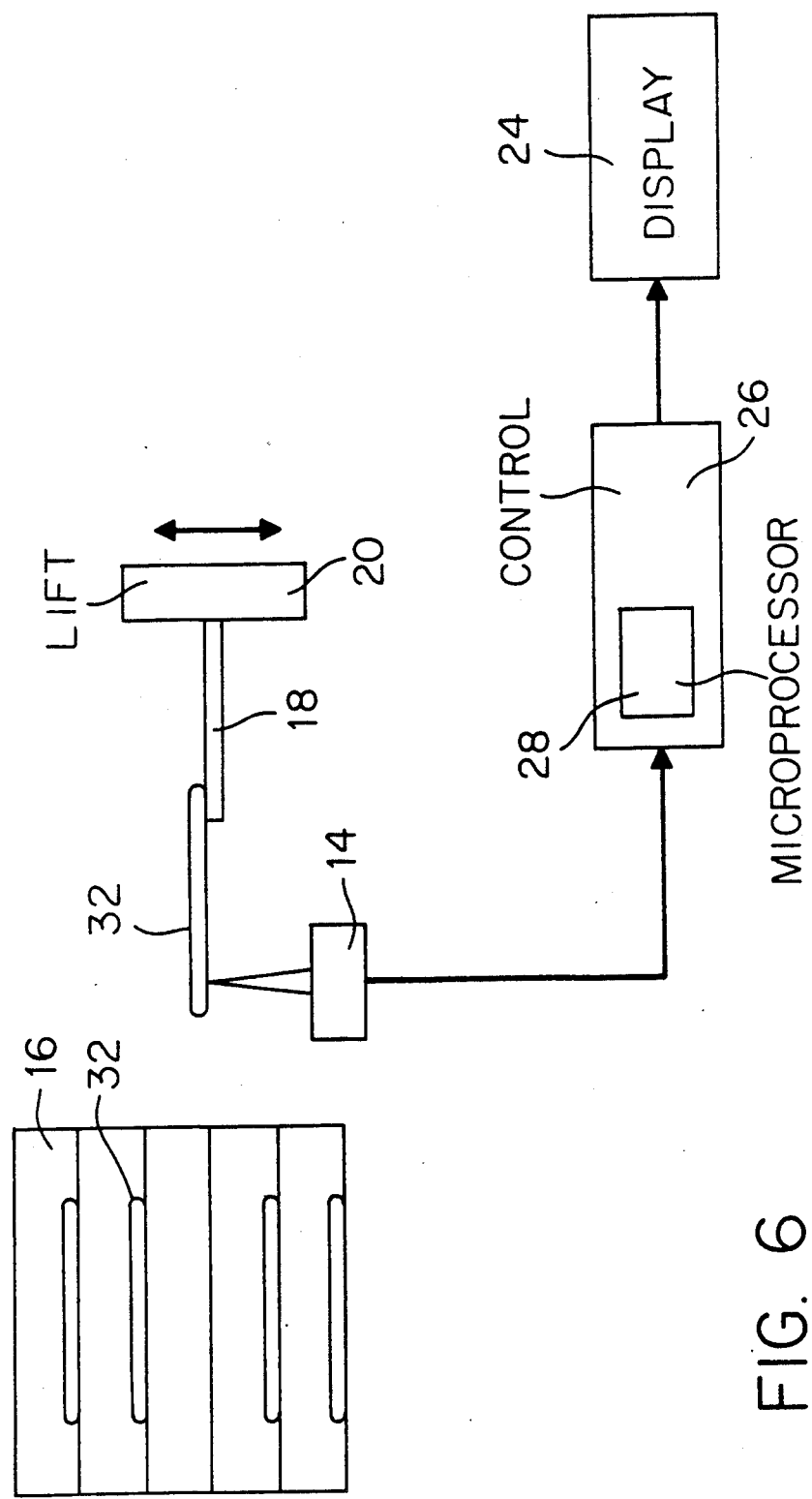
FIG. 6 is a schematic block diagram showing operational elements of the present invention.

FIG. 2: Search the track of a higher title-number: arrow moves to the right.

Not shown, is the reversed display, where the arrow moves left.

In most existing cases display-elements, which are inactive during the flow of functions, can be used for this dynamic display, e.g. segments of the time-display at title- or track-search, a LED-chain at a magazine set for the indication of the selection or the exchange of records at a magazine set. Thereby the true magazine status, the static display, of the records in the magazine compartments is substituted by the actual moving or dynamic display.

In particular, the compact disc recording and/or playback set 30 has a display 10 at an operational side 12 of the set 30 for displaying data intended for operational use of single astatic and dynamic display 24 depends on performance of searches or selection operations. The display 24 has a flow of motion of data elements related to search or selection operations arranged perpendicular to each other in respect to their direction of motion. The title or track search is carried out horizontally according to a horizontal plane of motion of a pick-up 14. The magazine compartments 16 are searched vertically according to a vertical plane of motion that corresponds to a direction of a record gripper 18 and record lift 20, when a magazine 22 is used with record compartments 16. The dynamic display 24 corresponds to a static display that is not used at the time that the dynamic display is to be used and is activated by a dynamic control 26. This dynamic control 26 may be in the form of micro-processor 28.

We claim:

1. A compact disc recording and/or playback set comprising: display means at an operational side of the set for displaying data intended for operational use of single record operation; static display means, and dynamic display means dependent on performance of searches or selection operations and having a flow of motion of data elements related to search or selection operations arranged perpendicular to each other in respect to their direction of motion, title or track search being carried out horizontally according to a horizontal plane of motion of pick-up means and magazine compartment search being carried out vertically according to a vertical plane of motion corresponding to a direction of a record gripper and record lift when using a magazine having record compartments or record receiving means one above another.

2. A compact disc recording and/or playback set comprising: display means at an operational side of the set for displaying data intended for operational use of single record operation; static display means, and dynamic display means dependent on performance of searches or selection operations and having a flow of motion of data elements related to search or selection operations arranged perpendicular to each other in respect to their direction of motion, title or track search being carried out horizontally according to a horizontal plane of motion of pick-up means and magazine compartment search being carried out vertically according to a vertical plane of motion corresponding to a direction of a record gripper for record lift when using a magazine having record compartments or record receiving means one above another; said dynamic display means comprising a static display not being used at the time that said dynamic display means is to be used and being activated by dynamic control means.

3. A compact disc recording and/or playback set as defined in claim 2, wherein said dynamic control means comprises a microprocessor.

* * * * *